(12) United States Patent
Audisio et al.

(10) Patent No.: US 8,132,561 B2
(45) Date of Patent: Mar. 13, 2012

(54) ELECTRONIC PRESSURE REDUCER OR REGULATOR UNIT FOR FEEDING GAS, PARTICULARLY METHANE OR HYDROGEN, TO AN INTERNAL COMBUSTION ENGINE, AND GAS FEEDING SYSTEM INCLUDING THIS UNIT

(75) Inventors: Filippo Audisio, Orbassano (IT);
 Massimiliano Bagnato, Orbassano (IT);
 Riccardo Groppo, Orbassano (IT);
 Alberto Manzone, Orbassano (IT);
 Damiano Micelli, Orbassano (IT); Paolo Reggio, Orbassano (IT)

(73) Assignee: METATRON S.r.l., Castel Maggiore Bo (IT)

( * ) Notice: Subject to any disclaimer, the term of this patent is extended or adjusted under 35 U.S.C. 154(b) by 925 days.

(21) Appl. No.: 11/930,833

(22) Filed: Oct. 31, 2007

(65) Prior Publication Data
 US 2008/0135019 A1 Jun. 12, 2008

(30) Foreign Application Priority Data
 Dec. 12, 2006 (EP) .................................... 06425833

(51) Int. Cl.
 *F02B 43/00* (2006.01)
(52) U.S. Cl. ..................................... 123/527
(58) Field of Classification Search .................. 123/447, 123/527, 529, 530; 137/102, 487.5, 489; 701/103
 See application file for complete search history.

(56) References Cited

U.S. PATENT DOCUMENTS

| | | | |
|---|---|---|---|
| 3,455,323 A | 7/1969 | Haupt | |
| 6,305,401 B1 * | 10/2001 | Uehara et al. | 137/102 |
| 6,688,323 B1 * | 2/2004 | Bartos et al. | 137/73 |
| 7,036,491 B2 | 5/2006 | Ricco et al. | |
| 2003/0168102 A1 * | 9/2003 | Santinanavat et al. | 137/489 |
| 2005/0241624 A1 * | 11/2005 | Ricco et al. | 123/527 |

FOREIGN PATENT DOCUMENTS

| | | |
|---|---|---|
| EP | 0 420 599 A2 | 9/1990 |
| EP | 1 209 336 A2 | 5/2002 |
| EP | 1 593 833 A1 | 9/2005 |
| GB | 2 121 563 A | 12/1983 |
| WO | WO 01/59537 A1 | 8/2001 |
| WO | WO 2006/106145 A1 | 10/2006 |

OTHER PUBLICATIONS

European Search Report from EP 06425833 completed Apr. 20, 2007.

* cited by examiner

*Primary Examiner* — Stephen K Cronin
*Assistant Examiner* — Sizo Vilakazi
(74) *Attorney, Agent, or Firm* — Heslin, Rothenberg, Farley & Mesiti P.C.; Victor A. Cardona, Esq.

(57) ABSTRACT

Provided in a gas-feed system, in particular a system for supplying methane or hydrogen to an internal-combustion engine, is an electronic pressure-reducer or pressure-regulator unit, integrated in which are both a pressure-reducing valve for reducing the pressure of the gas coming from the fuel tank to a value suitable for supplying a distribution manifold or rail and a modulating solenoid valve that functions as modulator of the degree of pressure reduction performed by the pressure-reducing valve. Likewise made in the body of said unit are passages that provide the communications of said valves with one another and of each of said valves with the inlet and the outlet for the gas in said unit. Furthermore, the unit incorporates an electronic control module for controlling the modulating solenoid valve.

16 Claims, 15 Drawing Sheets

*(Prior Art)*

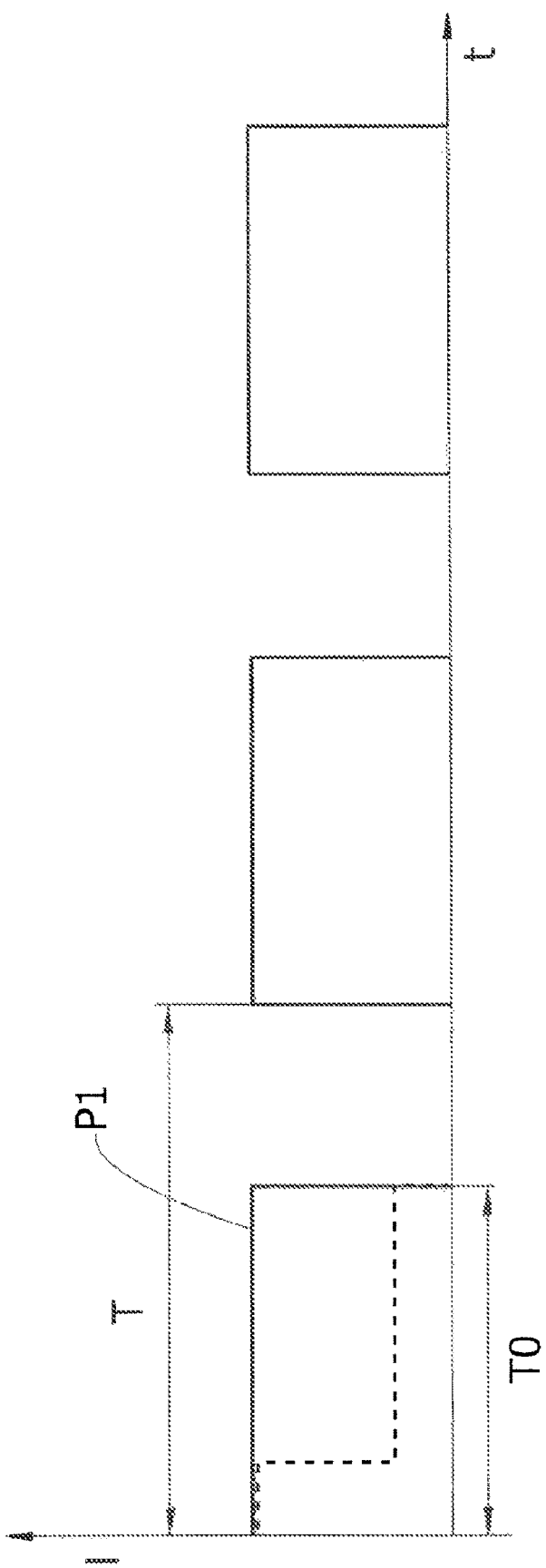

ELECTRONIC PRESSURE REDUCER OR REGULATOR UNIT FOR FEEDING GAS, PARTICULARLY METHANE OR HYDROGEN, TO AN INTERNAL COMBUSTION ENGINE, AND GAS FEEDING SYSTEM INCLUDING THIS UNIT

CROSS REFERENCE TO RELATED APPLICATIONS

This application claims priority from European patent application No. 06425833.8, filed on Dec. 12, 2006, the entire disclosure of which is incorporated herein by reference.

FIELD OF THE INVENTION

The present invention relates to systems for supplying gas, in particular compressed natural gas (CNG), for example methane, or else hydrogen, to an internal-combustion engine, in particular the engine of a motor vehicle, of the type indicated in the preamble of the annexed claim 1.

KNOWN ART

In the documents Nos. EP 1 593 833 A1 and U.S. Pat. No. 7,036,491 B2 the present applicant has already proposed a gas-feed system of the type referred to above, which represents a significant evolution with respect to the gas-feed systems previously used, in particular from the standpoint of the possibility of guaranteeing an efficient regulation of the pressure of the gas in the distribution manifold or rail as the operating conditions of the engine vary. A gas-feed system of the type illustrated in the aforesaid documents constitutes the preamble of the annexed claim 1.

FIG. 1 of the annexed plate of drawings shows the diagram of a gas-feed system according to one of the various embodiments proposed in the aforesaid prior documents. With reference to said figure, designated by 1 are the electromagnetically controlled injectors associated to the various cylinders of the engine, which are supplied with pressurized gas from a distribution manifold or rail 2. The reference number 3 designates a gas cylinder functioning as tank, in which pressurized gas, for example methane, is accumulated. The outlet of the gas cylinder 3 is connected via a piping 4 to the distribution manifold 2. Set in series in the piping 4 are: a safety valve 5, constituted by a shutoff solenoid valve, designed to block the outlet of the gas cylinder 3; a pressure sensor 6 (in the concrete embodiments the valve 5 and the sensor 6 are integrated in the structure of the gas cylinder); and a pressure-reducing valve 7. The reference number 2a designates a sensor for detecting the pressure in the rail or distribution manifold 2.

In the case, for example, of a system for supplying methane, the initial pressure of the methane within the gas cylinder 3, when the latter is full, is in the region of 200 bar. Said pressure of course drops as the gas cylinder 3 empties, until a minimum value in the region of 20 bar is reached.

At the same time, the electromagnetically controlled injectors 1 are capable of operating at sensibly lower gas pressures, normally lower than 10 bar. The purpose of the valve 7 is to bring the pressure of the gas to a value suitable for correct operation of the injectors 1, according to desired and pre-set parameters.

The structure of the pressure-reducing valve 7 of the gas-feed system of FIG. 1 is illustrated at an enlarged scale in the annexed FIG. 2, which is an axial cross-sectional view of the valve.

With reference to FIG. 2, the pressure-reducing valve that has already been proposed by the present applicant has a valve body 8, within which there is defined a restricted passage 9, set in the communication between an inlet passage 10 made in an inlet connector 11, and an outlet passage 12 made in an outlet connector 13. The connector 11 is to be connected to the piping 4 (FIG. 1) that carries the gas coming from the tank 3. The connector 13 is to be connected to a piping 14 that carries the gas at a reduced pressure up to the rail 2. The example illustrated refers to a single-stage valve that enables a single pressure jump. However, according to what is indicated in the prior documents identified above, there is nothing to rule out provision of a valve that presents in series two arrangements of the type illustrated in FIG. 2, to provide two pressure jumps in succession.

In the case of the example illustrated in FIG. 2, the restricted passage 9 is defined by a ring made of metal or an appropriate plastic material 15, pressed against the bottom surface of a seat, made in the body 8 of the valve, by the connector 11, which is screwed within the body 8. The ring 15, in addition to defining the restricted passage 9, also defines a valve seat for a ball-type open/close element 16, preferably made of metal material, which is pressed against the valve seat by a spring 17 that is set between the ball-type open/close element 16 and a contrast surface defined by the connector 11. The spring 17 is one with high flexibility and low preloading, and has the sole function of keeping the ball-type open/close element 16 in position.

The valve body 8 has an internal cylindrical cavity, within which a piston member 18 is guided in a slidable way. The piston member 18 has a generally cylindrical conformation and has one front end facing a chamber 19 that is set downstream of the restricted passage 9 and that communicates with the outlet passage 12. On the front end, the piston member 18 is provided with a prod 20 for pushing the ball-type open/close element 16 towards its opening position, against the action of the spring 17. The piston member 18 has its end opposite to the one facing the chamber 19 that faces a chamber 21 defined within the body 8 of the valve between the piston member 18 and a closing element 22 fixed to the body 8. The chamber 21 communicates, via an auxiliary connector 23 with a duct 24 that is to transmit to the chamber 21a modulating-pressure signal tending to push the piston member 18 downwards (as viewed in the figures) so as to tend to keep the ball-type open/close element 16 in the open position, via the prod 20.

Operation of the known pressure-reducing valve described above is illustrated in what follows.

In the resting condition, the modulating pressure supplied to the chamber 21 pushes the open/close element 16 into its opening position, against the action of the spring 17. The gas coming from the tank 3 (FIG. 1) reaches the inlet connector 11, and consequently passes through the restricted passage 9 and from here into the chamber 19. From the chamber 19 the gas arrives through the outlet connector 13 and the piping 14 (FIG. 1) at the distribution manifold 2, with a pressure value adequate for proper operation of the injectors 1.

Under the action of the pressure in the chamber 19, however, the piston member 18 is displaced, against the action of the modulating pressure in the chamber 21, in the direction of said chamber 21, until closing of the open/close element 16 against its seat in the ring 15 is enabled. When the pressure in the chamber 19 drops back to the value of the calibration pressure, the modulating pressure in the chamber 21 is able again to displace the piston member 18 into the position in which it brings about opening of the open/close element 16. In this way, the pressure in the chamber 19 varies cyclically, remaining in any case within a range of reduced values, adequate for proper operation of the injectors.

With reference again to FIG. 1, the line 24 that transmits the modulating-pressure signal to the chamber 21 of the pressure-reducing valve 7 is set downstream of a modulating solenoid valve 25. The structure of said modulating solenoid valve 25 is visible at an enlarged scale in the annexed FIG. 3. The function of said modulating solenoid valve 25 is to receive at an inlet connector 26 the pressure of the gas at outlet from the tank 3, which is communicated to the connector 26 via a line 27 derived from the line 4 upstream of the pressure-reducing valve 7. The modulating solenoid valve 25 produces, at an outlet connector 28, a pressure signal reduced with respect to the pressure at the inlet 26, which is sent via the line 24 to the auxiliary connector 23 of the pressure-reducing valve 7. As already referred to above, the piston member 18 of the valve 7 is pushed by the pressure signal that arrives through the line 24. Consequently, by varying said pressure signal, it is possible to vary the response of the pressure-reducing valve 7 and consequently vary the pressure jump provided thereby or, in other words, vary the pressure of the gas that is sent to the rail 2.

With reference to the diagram of FIG. 1, an electronic control unit C receives the signal 29 from the pressure sensor 2a, said signal indicating the value of the pressure existing in the rail 2, and compares it with a signal 30 indicating the desirable pressure within the rail 2 for each operating condition of the engine. For this purpose, for example, there can be associated to the electronic control unit C memory means, in which there are stored pre-set maps that supply the desired value or range of values of the pressure of the rail 2 as the different operating parameters of the engine vary. On the basis of the comparison between the signal 29 and the signal 30, the electronic control unit C issues an output signal 31 that modulates the solenoid valve 25 in order to enable, via the pressure-reducing valve 7, the pressure jump each time desired. In the case of the system of FIG. 1, a feedback control of the pressure in the fuel-supply rail is consequently implemented.

With reference to FIG. 3, the modulating solenoid valve 25 has a restricted passage 32 defined by a bushing 33 pushed within a respective seat made in a body 34 of the valve by a helical spring 35 having one end in contact with the bushing 33 and the opposite end in contact with a closing element 36 screwed within the body 34. The bushing 33 also defines a valve seat for a ball-type open/close element 37 that is connected to an anchor 38 of an electromagnet including a solenoid 39 and a spring 40, which tends to push the open/close element 37 into the closed condition. The gas enters the valve through a passage 41 made in the inlet connector 26, reaches the restricted passage 32 and from here, if the open/close element 37 is in the opening position, passes into a chamber communicating with an outlet passage 42 made in the outlet connector 28.

The solenoid 39 is controlled for regulating the pressure jump between the inlet and the outlet of the valve 25 so as to supply the outlet connector 28 with a modulating pressure of a value adequate to obtain in the pressure-reducing valve 7 a pressure reduction suited to the specific operating conditions of the engine.

Preferably, the control unit C is pre-arranged for controlling a periodic switching of the modulating solenoid valve 25 between its closed condition and its open condition, at a predefined rate. Regulation of the pressure is obtained by varying the duty cycle of the valve, i.e., by varying in each cycle the ratio between opening time and the total period of opening and closing of the valve, as a function of the operating conditions of the engine and in particular as a function of the conditions of static and dynamic load of the engine.

Purpose Of The Invention

The purpose of the present invention is to improve the system described above previously proposed by the present applicant, in particular by simplifying and rationalizing its components.

The Invention

With a view to achieving the aforesaid purpose, the subject of the invention is a system for supplying gas to an internal-combustion engine of the type that has been described above and characterized in that the pressure-reducing valve and the modulating solenoid valve are integrated in the body of a single electronic pressure-reducer or pressure-regulator unit, there being provided in said body:

the inlet for the gas coming from the fuel tank;
the outlet for the gas that is supplied to the distribution manifold or rail;
a passage for communication between the inlet and the pressure-reducing valve;
a passage for communication between the inlet and the modulating solenoid valve;
a passage for communication between the modulating solenoid valve and the pressure-reducing valve;
a passage for communication between the modulating solenoid valve and the outlet; and
a passage for communication between the pressure-reducing valve and the outlet, said unit likewise incorporating an electronic control module for controlling the solenoid of the modulating solenoid valve.

Also forming the subject of the invention is the electronic pressure-reducer or pressure-regulator unit taken in itself, according to what is defined in the annexed claim 11.

According to a further characteristic, integrated in the body of said mechanical-electronic pressure-regulator unit is a passage that sets in direct communication the outlet of the modulating solenoid valve with the distribution manifold or rail, said passage including a restricted section defined by a hole of calibrated diameter. Preferably, the portion of duct with said restricted section is made in an element that is separate from the body of the unit and can be replaced rapidly, such as for example a screw element.

In a first embodiment, the aforesaid electronic control module is provided for stand-alone operation and is programmed to enable an extremely precise modulation, for example down to one tenth of a bar, of the pressure sent to the rail, according to desired and pre-set criteria. In this case, the unit functions as electronic pressure reducer.

In a second embodiment, the aforesaid electronic control module is in communication with the electronic control unit of the engine and is provided for carrying out a regulation of the modulating valve as a function of the operating conditions of the engine. In this case, the unit according to the invention operates as electronic pressure regulator.

BRIEF DESCRIPTION OF THE DRAWINGS

The present invention will now be described with reference to a preferred embodiment, illustrated purely by way of non-limiting example in the annexed plate of drawings, in which:

FIGS. 12A, 12B, and 12C are time plots corresponding to a waveform generated by the electronic module of FIG. 10.

DESCRIPTION OF THE REFERRED EMBODIMENT OF THE INVENTION

Figure 1:
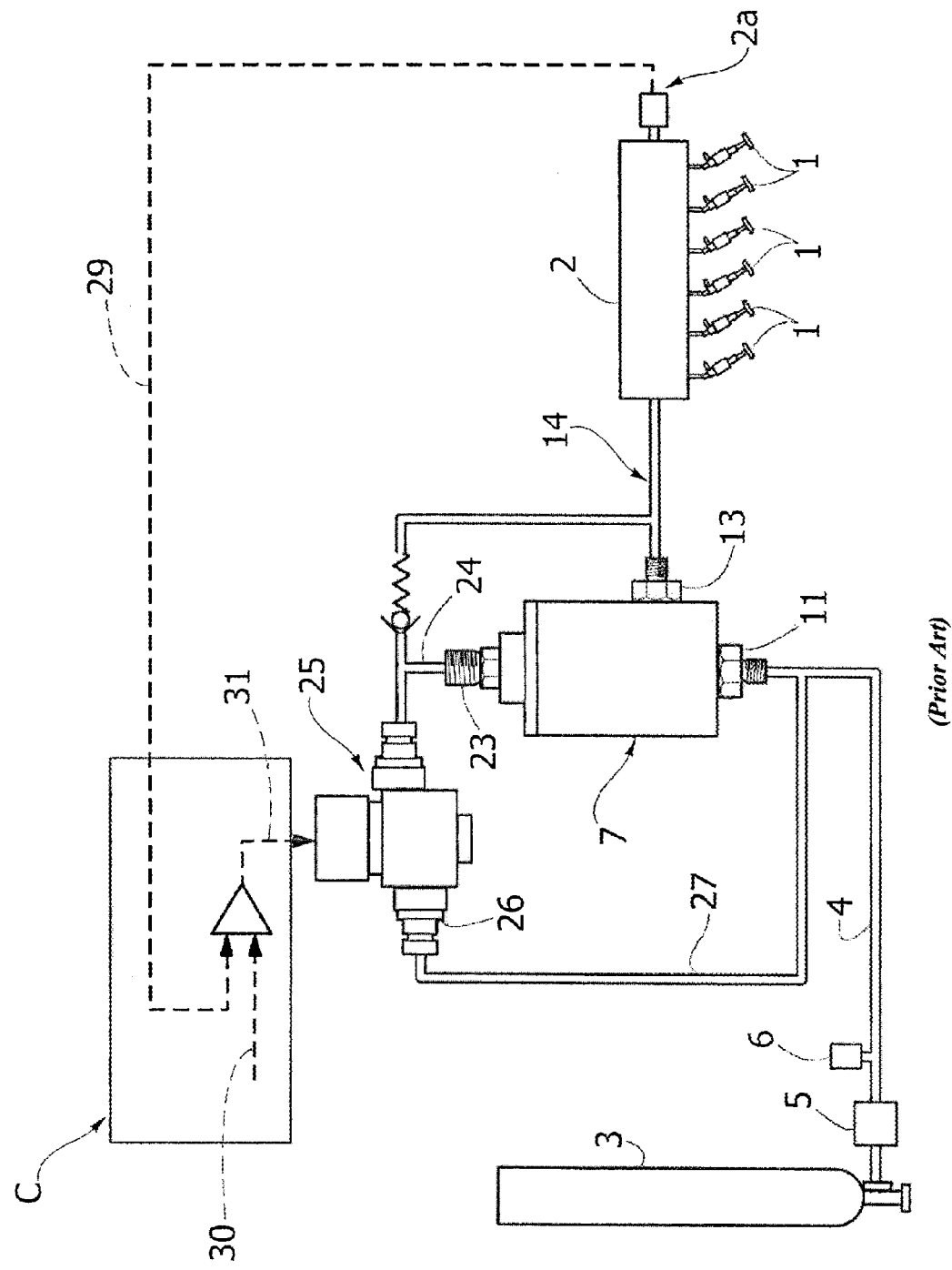
FIGS. 1-3, already described above, refer to the known art.
Figure 2:
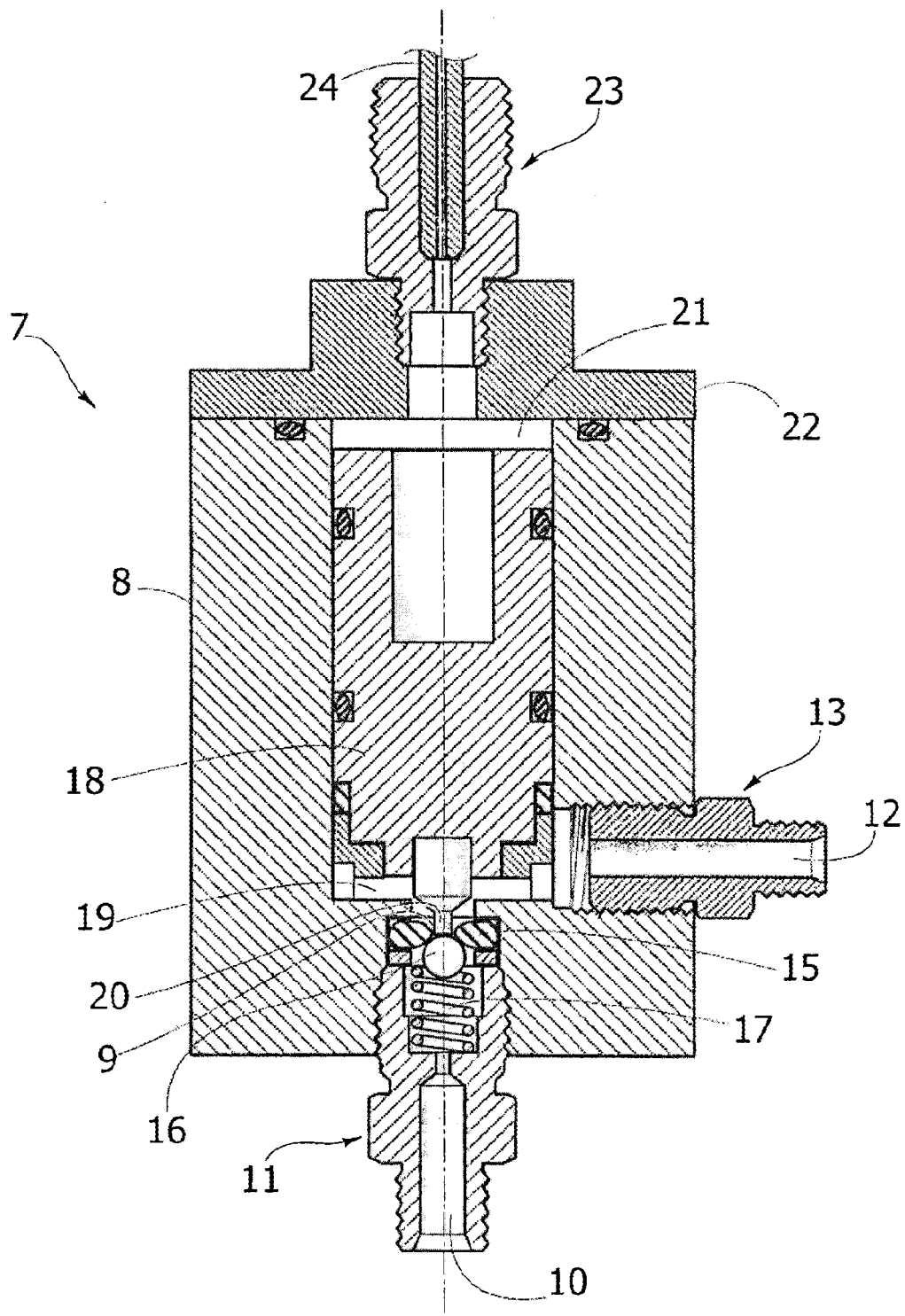
Figure 3:
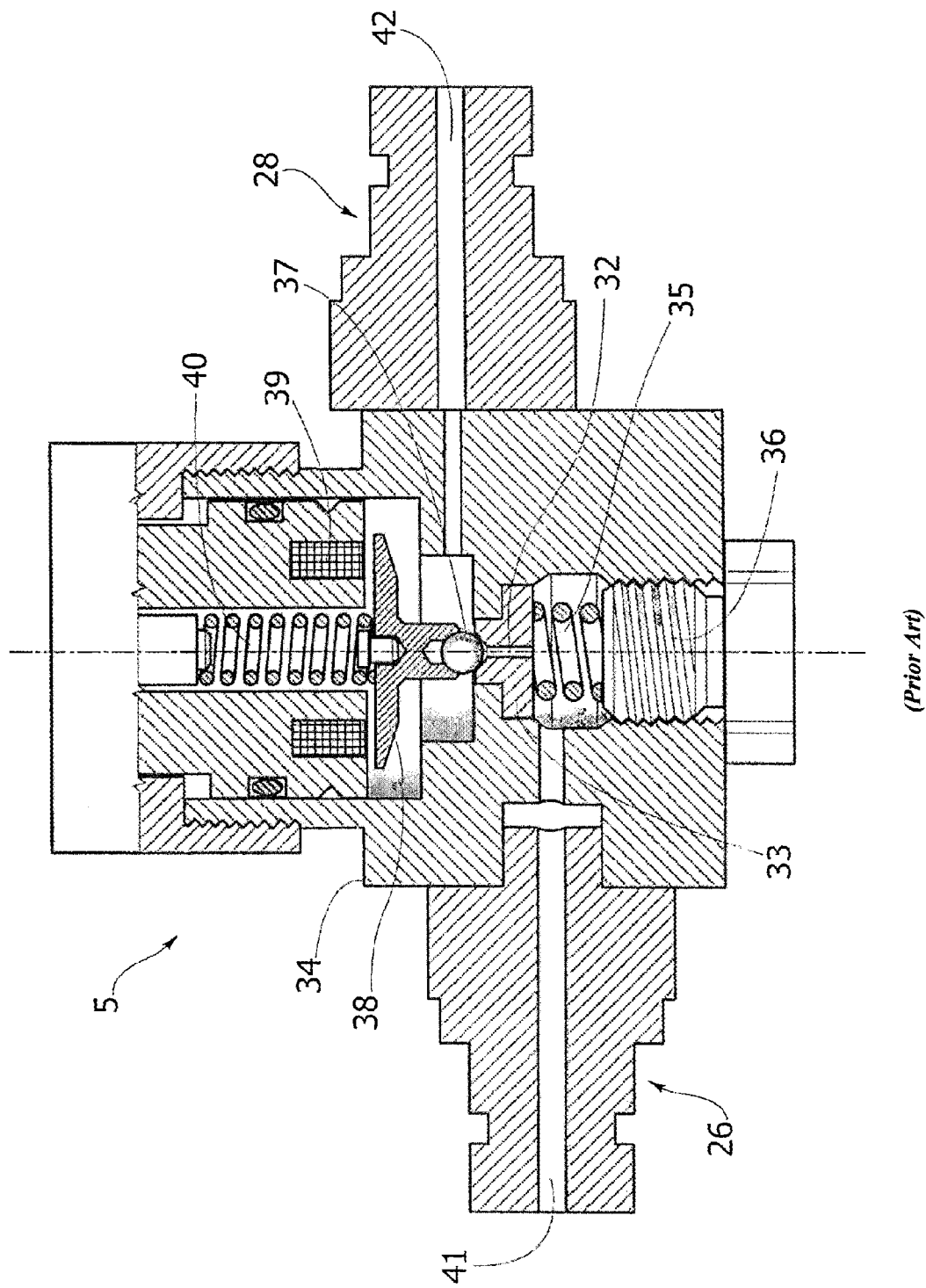

FIGS. 1-3 refer to the known art of the prior patents filed in the name of the present applicant and have already been described above.

Figure 4:
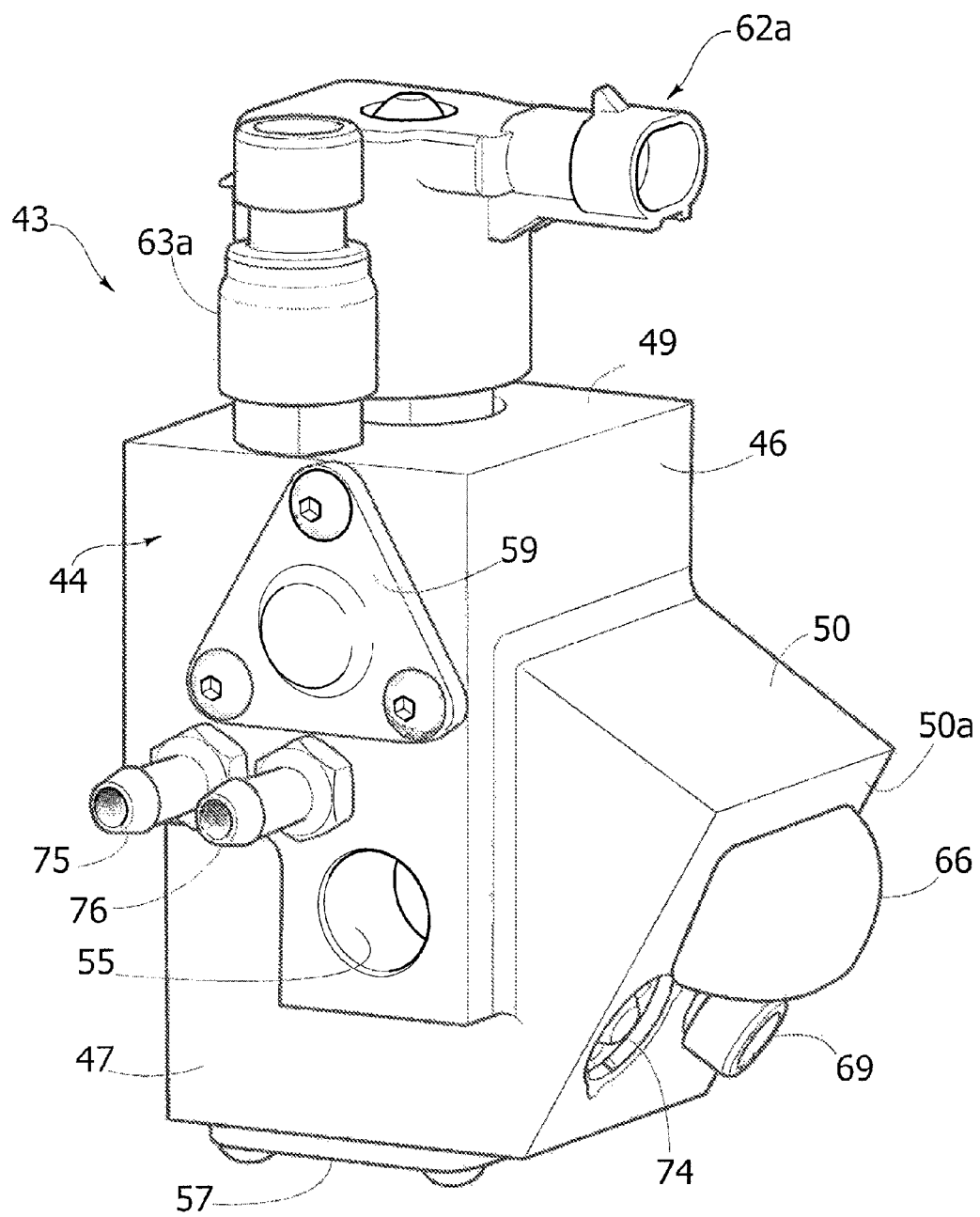
FIGS. 4 and 5 are two perspective views of the mechanical-electronic pressure-reducer or pressure-regulator unit forming part of the system according to the invention.

In FIGS. 4-11, the reference number 43 designates as a whole a mechanical-electronic pressure-reducer or pressure-regulator unit provided in conformance with the present invention. The unit 43 has a body 44, of a prismatic shape, having a front surface 45 (FIG. 5), a rear surface 46 (FIG. 4), two side surfaces 47, a bottom surface 48 (FIG. 5), and a top surface 49 (FIG. 4). The rear surface 46 has a projecting part 50.

Figure 6A:
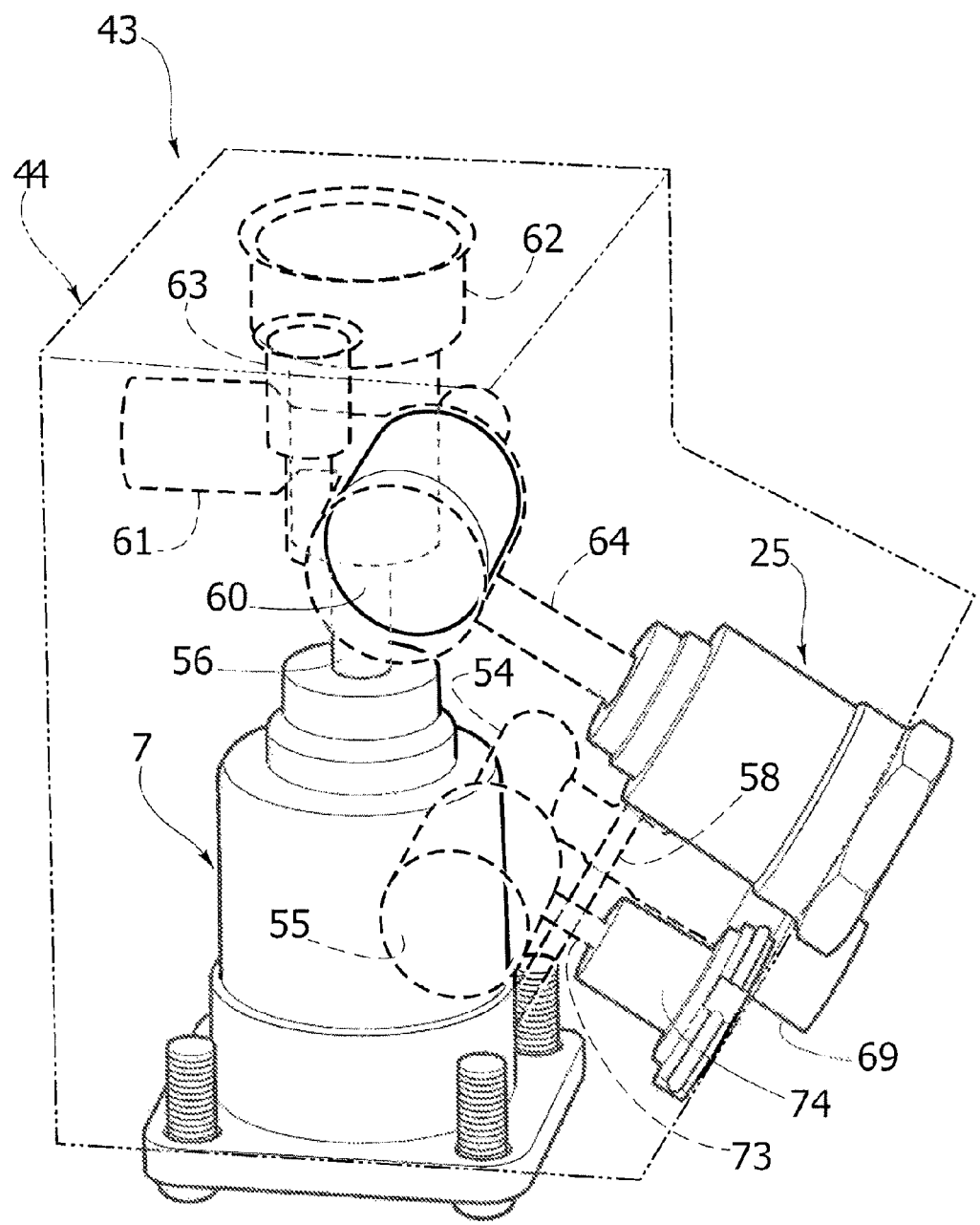
FIGS. 6A and 6B are see-through perspective views of the component parts of the unit illustrated in FIGS. 4 and 5.
Figure 6B:
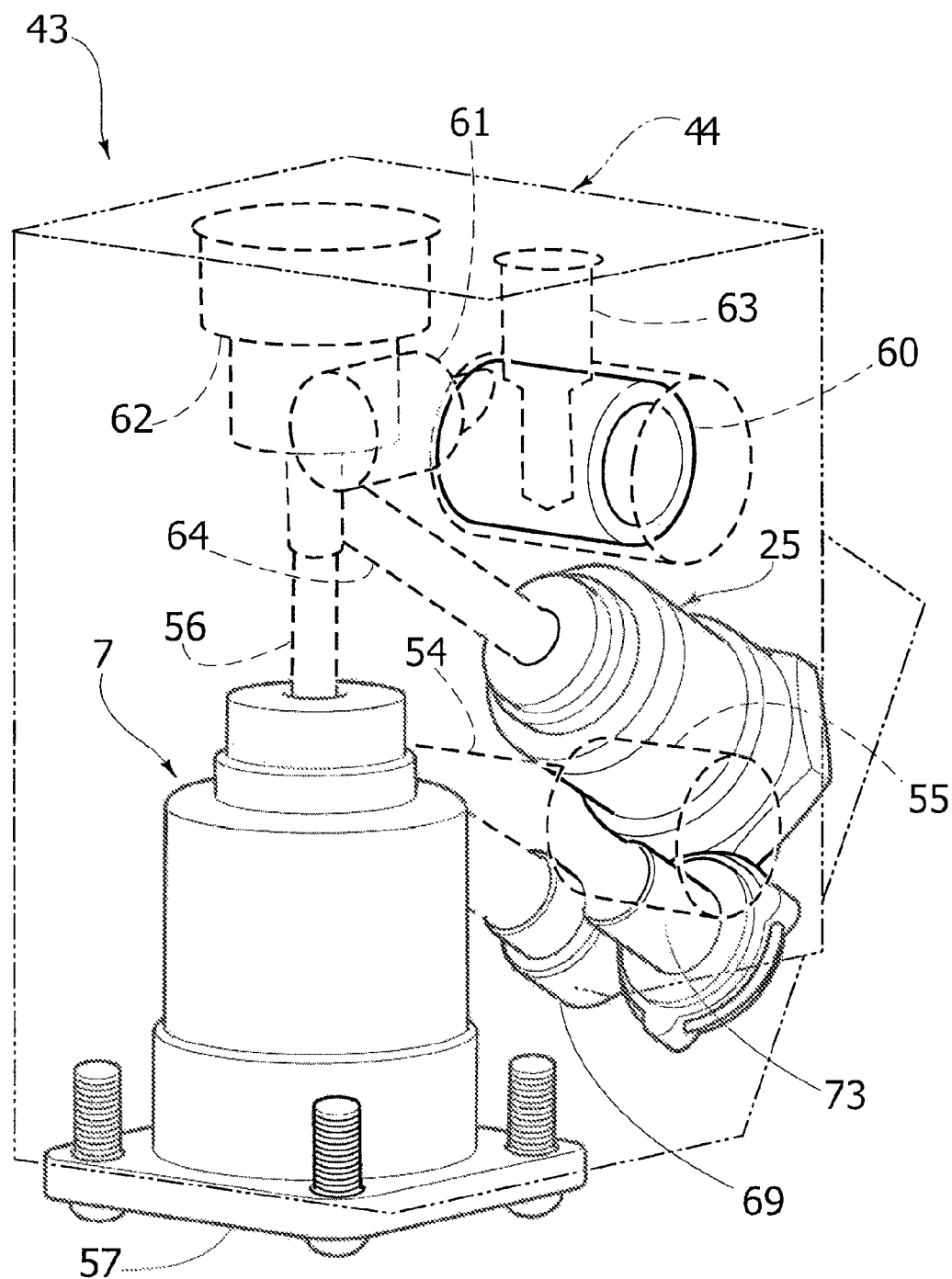
Figure 7:
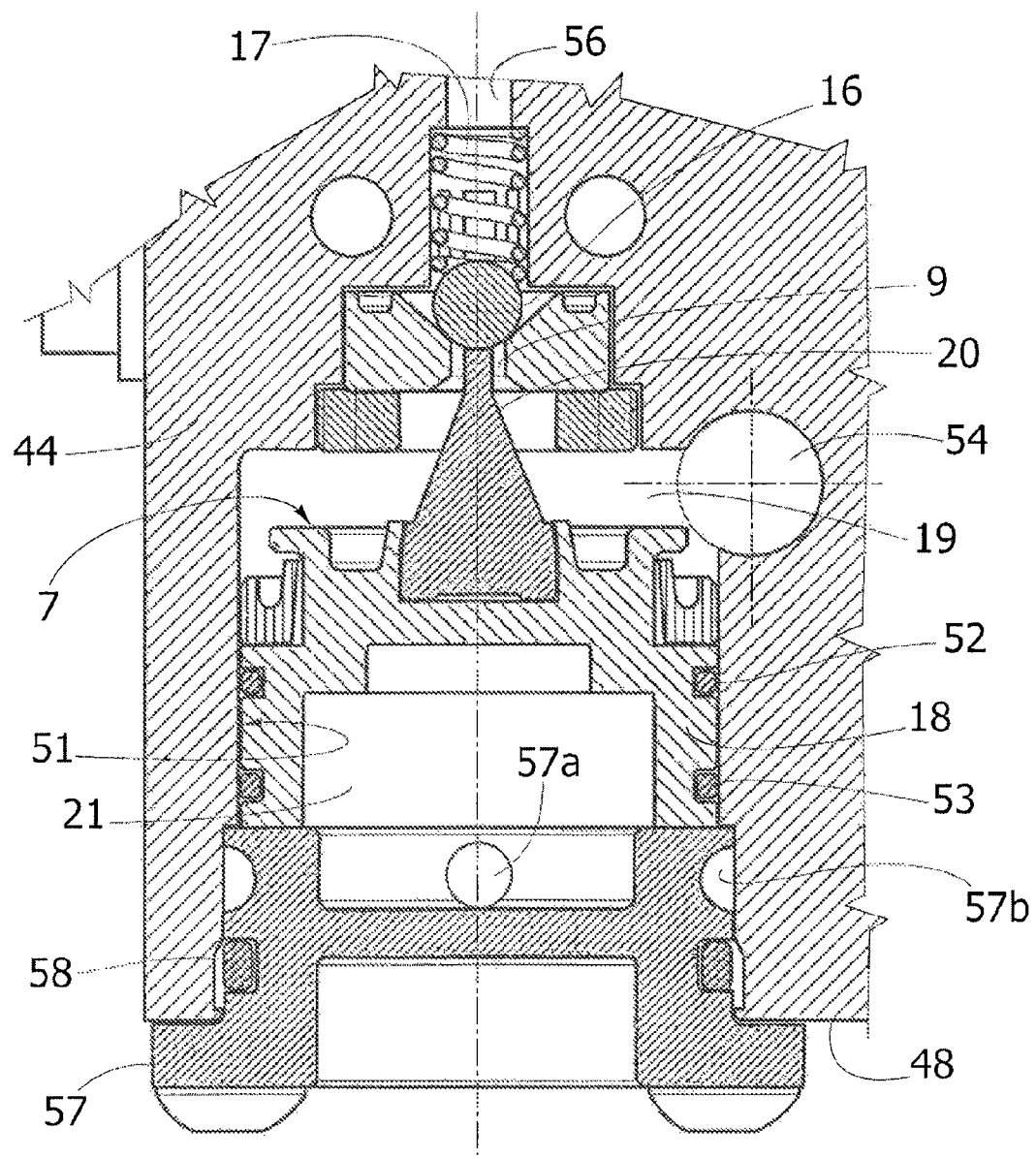
FIGS. 7, 8 and 9 are cross-sectional views of some parts of the unit of FIGS. 4-6.

With reference to FIG. 7, the body 44 has a cavity, made starting from the bottom surface 48, in which the pressure-regulating valve 7 is received. In a way similar to what has been described for the pressure-regulating valve 7 according to the known art (see FIG. 2) also the pressure-regulating valve 7 illustrated in FIG. 7 has a piston member 18 that is slidably mounted within a cylindrical portion of the cavity 51, with the aid of rings 52 and 53. One end of the piston member 18 faces a chamber 19 that communicates via a duct 54 (see FIGS. 6A, 6B and 7) with a hole 55 made in the surface 47 of the unit (FIGS. 4, 5), for installation of an outlet connector of the gas, to which there can be connected the piping 14 (FIG. 11) that is to carry the gas at outlet from the unit 43 to the distribution manifold or rail 2. The chamber 19 also communicates with a passage or channel 56 for supplying pressurized gas coming from the tank via a restricted passage 9 defined by a ring 15 received in a corresponding seat defined by the surface of the cavity 51. In a way similar to what has been illustrated with reference to the known art (FIG. 2), the aforesaid communication is controlled by a ball-type open/close element 16 that is pushed by a spring 17, pre-arranged in a widened portion of the end stretch of the passage 56, which gives out into the cavity 51. The spring 17 tends to push the ball-type open/close element 16 against a conical seat defined on the face of the ring 15 facing the ball-type open/close element 16 so as to close the passage through the restricted section 9. In a way similar to what has already been described for the known art illustrated in FIG. 2, the ball-type open/close element 16 can be pushed towards an opening position of the aforesaid communication, against the action of the spring 17, by a prod 20 that is mounted rigidly on the end of the piston member 18 facing the chamber 19.

The opposite end of the piston member 18 faces a chamber 21 defined between the piston member 18 and a closing member 57 that is received within the cavity 51 with the interposition of a seal ring 58 and that has an end portion shaped like a quadrangular plate, centrally hollowed, fixed by means of screws to the bottom surface 48 (FIG. 5) of the body of the unit 43. The chamber 21 communicates, via one or more radial holes 57a made in the body of the element 57, with a circumferential chamber 57b defined by a peripheral groove of the element 57. The chamber 57b communicates in turn with a passage 58 (FIG. 6A), which is made in the body 44 of the unit 43 that is to receive the gas leaving the modulating solenoid valve 25, as will be described in detail in what follows.

Fixed by means of screws on one of the two side surfaces 47 of the unit 43 is a plate 59 (FIGS. 4 and 5), which closes a seat, giving out onto said surface, where a filter 60 (FIGS. 6A, 6B) is inserted for filtering the gas coming from the tank. The gas coming from the tank enters the body 44 of the unit 43 via an inlet connector (not illustrated) that is mounted in an inlet hole 61 (see FIGS. 5, 6A, 6B) made in the front surface 45 of the body 44 of the unit 43. The gas that enters the inlet hole 61 reaches the passage 56 (FIG. 7), which conveys the gas to the pressure-reducing valve 7 after it has passed through the filter 60, by means of channels not visible in the drawings.

In addition, the communication between the inlet hole 61 and the passage 56 is controlled by a shutoff solenoid valve 62 (see FIGS. 4, 5, 6A, 6B) set downstream of the filter, in itself of a known type, which is received in a seat made starting from the top surface 49 of the body of the unit. Mounted on said surface is the body 62a of the electromagnet associated to said shutoff valve.

Also made in the top surface of the body 44 is a seat 63 (FIGS. 6A, 6B) for a sensor of the pressure of the gas entering the unit, the sensor including a top part 63a projecting above the top surface 49 of the body 44 of the unit.

With reference in particular to FIG. 6B, branching off from the passage 56 that carries the gas at high pressure towards the pressure-reducing valve 7, is a passage 64 that carries the gas at high pressure to the modulating solenoid pressure valve 25.

The modulating valve 25 is mounted within a cavity 65 (FIG. 8) made in the body 44 of the unit 43 starting from an inclined surface 50a (FIG. 4) of the projecting part 50.

Figure 8:
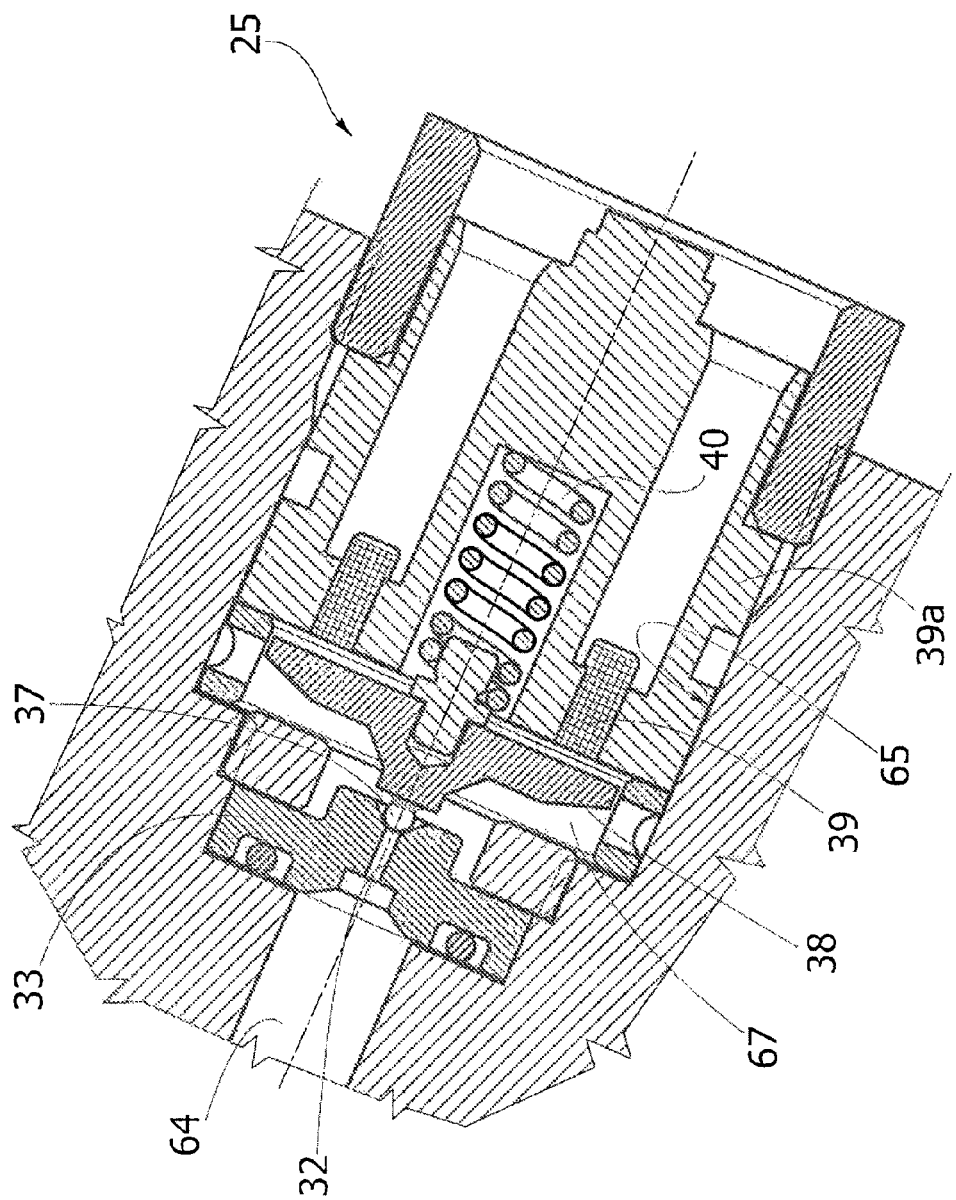

With reference to FIG. 8, in a way similar to what has been described for the modulating solenoid valve according to the known art illustrated in FIG. 3, the modulating valve 25 forming part of the unit according to the invention envisages a restricted passage 32 made centrally and axially through a disk 33, which is fixed against an end surface of the cavity 65 into which the passage 64 gives out. One end of the restricted passage 32 can be stopped by means of a ball-type open/close element 37 carried by the mobile anchor 38 of an electromagnet including a solenoid 39 mounted in a housing for a bushing 39a fixed within the cavity 65. A spring 40 is housed in a seat made in a central pin forming an integral part of the bushing supporting the solenoid and tends to push the anchor 38 into the position for closing the restricted passage 32. The anchor 38 is constituted by a disk facing one end of the solenoid 39 so as to exploit more efficiently the lines of magnetic flux generated by the solenoid as compared to more traditional configurations of electromagnet, in which the mobile anchor is a pin that traverses the solenoid axially.

Associated to the outer end of the body supporting the solenoid is a cap-like removable casing 66 (FIG. 4), which contains and protects an electronic module for control of the solenoid 39.

When the communication through the restricted passage 32 is open, the gas coming from the duct 64 passes into a chamber 67, with reduction of pressure. The gas with reduced pressure coming from the chamber 67 passes through the channel 58 (FIG. 6A) into the chamber 21 (FIG. 7) of the pressure-reducing valve 7.

Figure 9:
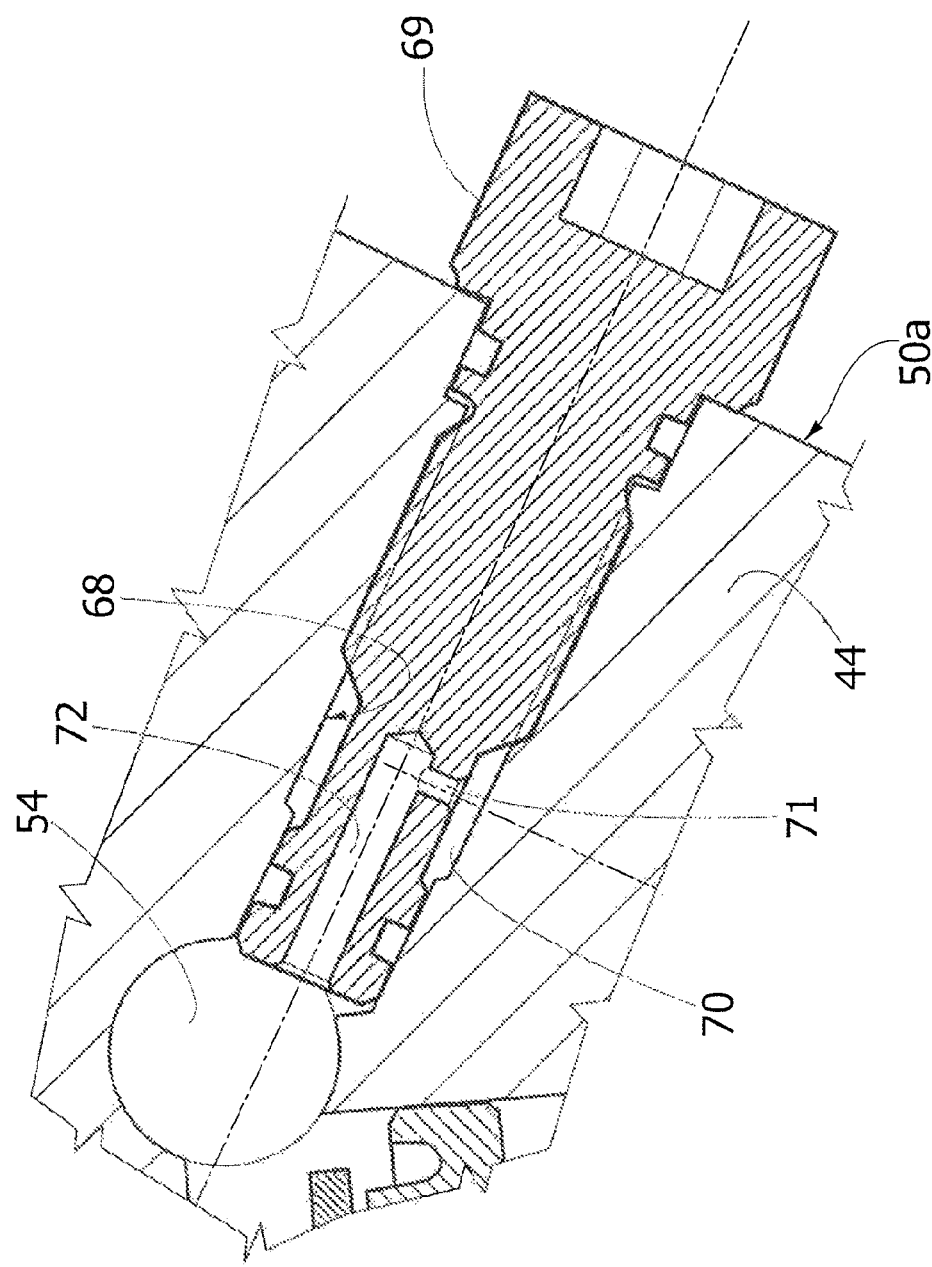

With reference to FIG. 9, the passage 58 likewise intercepts a hole 68 giving out onto the inclined face 50a of the body 44, in which a screw 69 is screwed (see also FIG. 4). Said screw has a body with a portion of restricted diameter that defines, with the wall of the hole 68, an annular chamber 70. Said annular chamber 70, which thus communicates with the passage 58 (FIG. 6A) coming from the outlet of the modulating valve 25, likewise communicates with the passage 54 for outlet of the gas from the unit 43 via a restricted hole 71, of calibrated diameter, made radially through the body of the screw 69 and giving out into an axial channel 72, which is also made in the body of the screw 69 and in turn gives out into the end of the body of the screw in the passage 54.

Consequently, as may be seen, the outlet of the modulating solenoid valve 25, in addition to communicating with the chamber 21 of the pressure-reducing valve 7, also communicates directly with the distribution manifold or rail, by means of a restricted passage 71. Said restricted passage has proven advantageous for correct operation of the modulating solenoid valve and of the entire mechanical-electronic pressure-regulator unit. The specific installation described above enables the further advantage of being able to provide different screws with different diameters of restricted hole, so as to be able to vary easily the diameter of the hole 71 according to the specific requirements of operation.

The passage 54 that leads to the outlet of the unit also communicates, via a channel 73 (FIG. 6A), with a cavity giving out onto the aforesaid inclined external surface 50a, where an overpressure valve (in itself of a known type and hence not further illustrated herein) 74 is mounted, designed to vent the gas on the outside in the case where the pressure in the passage 54 exceeds a pre-set and calibratable value.

Figure 5:
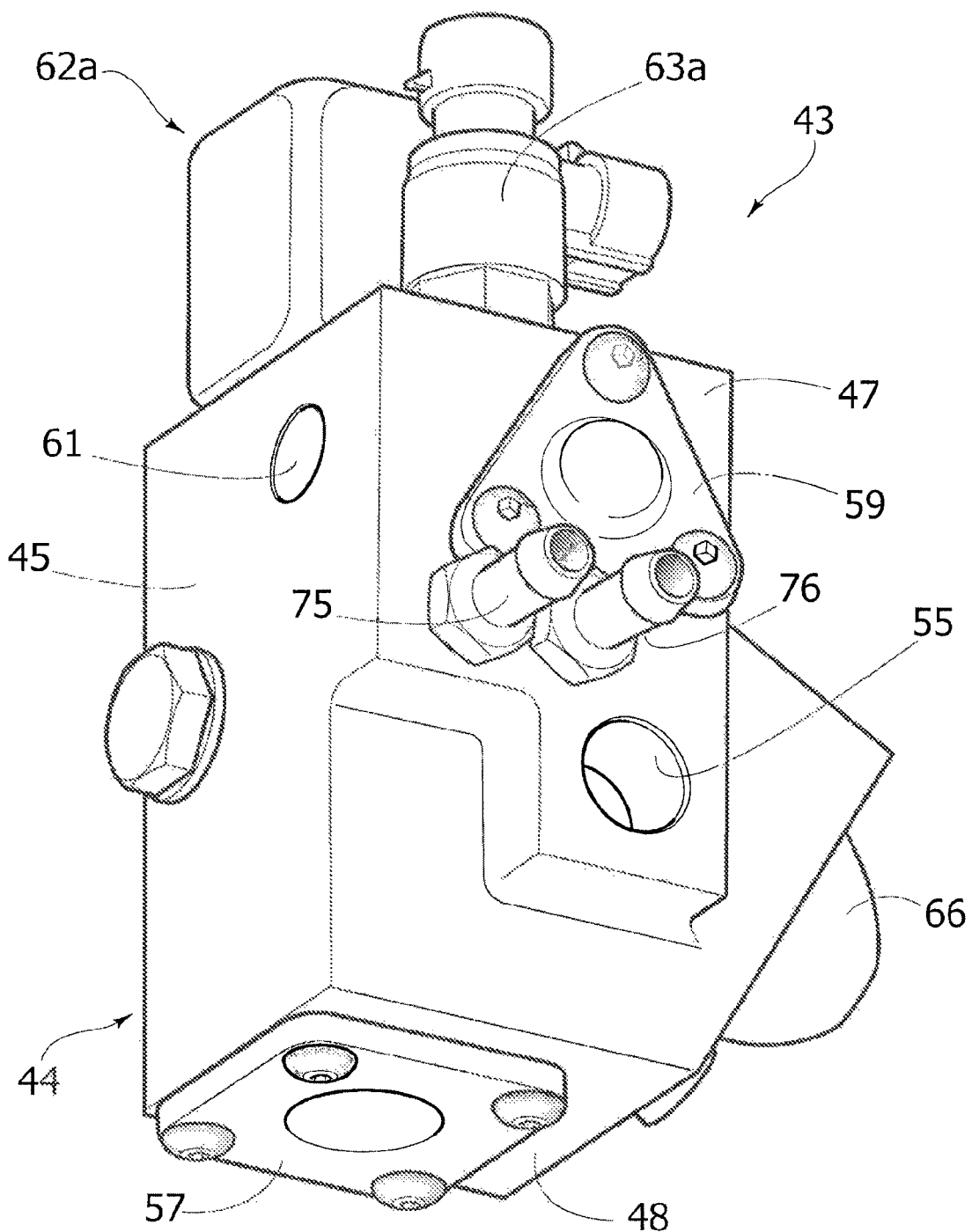

With reference to FIGS. 4 and 5, the body 44 of the unit 43 is also provided with an inlet connector 75 and an outlet connector 76 for a heating fluid that is to circulate through a passage (not visible in the drawings) made in the body 44 for the purpose of preventing formation of ice following upon cooling due to the expansion of the gas within the unit. Alternatively, heating means of an electrical type can be provided. It should also be noted, however, that the cooling due to the expansion of the gas is at least in part beneficial, for the purpose of guaranteeing correct operation of the electronic module forming part of the unit, whereas conversely, heating of the components of the electronic module during operation offsets at least in part an excessive cooling due to the expansion of the gas.

Figure 10:
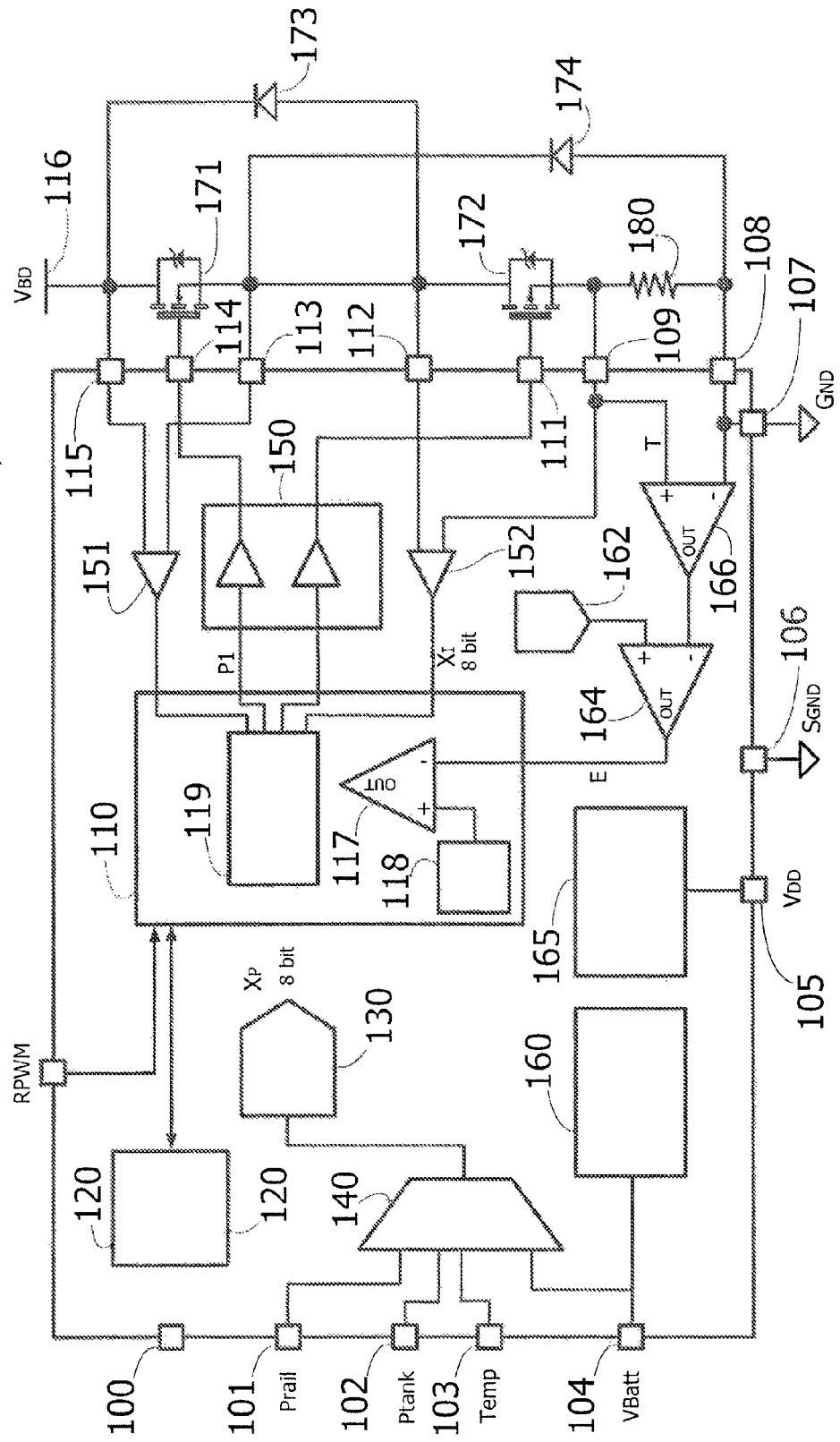
FIG. 10 is a diagram of the electronic module for control of the solenoid of the modulating solenoid valve.

An example of embodiment of the electronic control module of the solenoid 39 of the pressure-modulating valve 25 is illustrated in FIG. 10, where it is designated as a whole with the reference number 77. As already clarified above, the invention is characterized also in that said electronic control module of the modulating valve is integrated in the unit according to the invention.

As already referred to above, the solenoid 39 of said solenoid valve 25 is controlled by the electronic module with a pulse-width-modulation (PWM) signal so as to enable variation of pressure reduction through the modulating valve 25 by means of a variation of the duty cycle of the valve, i.e., by means of a variation of the ratio between the opening time of the valve and the total period in each cycle of opening and closing of the valve.

The electronic module 77 hence comprises in particular a control logic 110, for example obtained via an ASIC custom circuit. Said control logic 110 presides over control of the waveform of the current sent to the solenoid 39, as pulse-width-modulation signal P1. Said pulse-width-modulation signal P1 operates, in the example illustrated herein, at the frequency of 20 Hz.

The solenoid 39 of the solenoid valve 25 (not represented in FIG. 11) is connected between a positive terminal 113 and a negative terminal 112 at output from the electronic module 77, at which said pulse-width-modulation signal P1 arrives through a driving stage 150 obtained by means of current-amplifying stages, i.e., with circuits capable of supplying high peak currents in an extremely short time (typically, just a few tens of nanoseconds), as well as, by means of a bridge circuit 190, connected externally via corresponding terminals of the electronic module 77. The function of the bridge circuit 190 will be illustrated more fully in what follows.

The electronic control module of the solenoid 77 comprises a plurality of input terminals; namely:—to an input terminal 100 there arrives a low-speed communication signal L, originated by the engine control unit C, which, through a local network interface module 120 of a LIN (Local Interconnect Network) type, is transmitted to the control logic 110 for conveying commands from the electronic control unit of the engine;

to an input terminal 101 there arrives, detected via a purposely provided sensor, which can possibly be the sensor 2a of FIG. 1 that communicates with the engine control unit C or else a sensor provided separately, a signal indicating the pressure $P_{rail}$ of the rail 2, whilst to respective terminals 102 and 103 there arrive the pressure signal $P_{tank}$ of the tank 3 and the temperature signal Temp of the manifold; the signals to the terminals 101, 102, 103 constitute the inputs of a multiplexer 140, which selects from among said signals the signal to be transferred to the control logic 110 after a prior conversion into an 8-bit digital signal, performed in an analog-to-digital converter 130; present in a preferred version of the electronic module 77 is just the signal indicating the pressure $P_{rail}$ of the rail 2, so that the multiplexer 140 is not necessary, and the analog-to-digital converter generates, from the signal indicating the pressure $P_{rail}$ of the rail 2, a pressure-feedback digital signal $X_P$;

to an input terminal 103 there arrives the battery voltage $V_{batt}$ controlled by the ignition key, which is supplied to a power-supply module 160 of the electronic module 77; said power-supply module 160 supplies a voltage, for example 5V, for supplying the control logic 110; furthermore, it operates also as regulator for supplying an 18-V regulated voltage to the local network interface module 120, in the event of overvoltages on the load, performing the so-called "load dump" function; in fact, at high voltages, for example beyond 27 V, the local network interface module 120 may fail; the electronic module 77 moreover comprises a sensor power supply 165 for supplying to an output terminal 105 a digital supply voltage $V_{DD}$ for the sensors, as well as to an output terminal 106 a corresponding digital ground node $S_{GND}$;

to an input terminal 115 there moreover arrives from the control unit a signal RPWM for driving the pulse-width modulation; said signal, which is then sent directly to the control logic 110, is redundant with respect to the information contained in the low-speed communication signal L; this is in fact a redundant signal, sent to obviate possible interruptions of wires that connect the electronic module 77 to the engine control unit C.

The control logic 110 comprises a controller 119, of a proportional-integral type, which supplies, on the basis of the desirable pressure set as reference (setpoint) by the control unit C in the function of regulator, or, as more fully detailed in what follows, set directly in the electronic module 77 in the function of regulator, the pulse-width-modulation signal P1. The controller 119 is indicated, by way of example, as one of a proportional-integral type, but it is clear that other types of control may be implemented in the control logic 110. The pulse-width-modulation signal P1 reaches the gate electrode of a MOSFET 171, belonging to the bridge circuit 190, the source electrode of which is connected to the positive terminal 113 of the solenoid 39. The line that connects the controller 119 to the negative terminal 112 of the solenoid 39 does not instead transmit a modulated signal, but a constant level of current during the states of opening of the solenoid 39. Said line is also connected on a terminal 111 to the gate electrode of a second MOSFET 172, the drain electrode of which is connected to the terminal 112. Connected between the drain electrodes of the MOSFETs 171 and 172 is a first diode 173, whilst a second diode 174 is connected between a terminal 108, connected in turn to a ground electrode GND on a terminal 107, and the source electrode of the MOSFET 171. The MOSFETs 171 and 172 and the diodes 173 and 174 make up the bridge circuit 190, connected externally to the electronic module 77 on the terminals 108, 109, 111, 112, 113, 114 and 115. Said external connection is chosen basically for limiting the overall dimensions of the electronic module 77, even though it is of course possible to integrate the bridge circuit 190 in said electronic module 77.

The electronic module 77 hence moreover envisages input terminals 115 and 109, which feed back, through respective amplifiers 151 and 152 in the module 77, the drain voltage of the MOSFET 171 and source voltage of the MOSFET 172 to the controller 119, for executing a function of diagnosis based upon the monitoring of the drain-to-source voltage of said MOSFETs 171 and 172.

The MOSFET 171 has its own drain electrode connected to a terminal 116, on which the direct battery voltage VBD is present, i.e., the voltage picked up directly from the pole of the battery of the motor vehicle, without setting it under the control of the ignition key. The MOSFET 172, instead, has its own source electrode connected to a terminal 109.

Moreover provided is a sense resistor 180, connected between the source electrode of the MOSFET 172 and the ground GND, for detecting a current intensity I existing on the solenoid 39. Also said sense resistor 180 is in general connected externally to the electronic module 77. The sense resistor 180 has, in the example represented which operates, as explained more fully in what follows, with levels of current of 12 A and 5 A, a value of 10 mΩ. Arranged across said sense resistor 180, corresponding to the terminal 109 and to the terminal 108, in the electronic module 77 are the inputs of an amplifier 166, which supplies the current value detected, amplified, to the inverting input of a second differential amplifier 164. Said amplifier 164 receives, on its other input, the output of a digital-to-analog converter 162, which converts an 8-bit digital signal $X_1$ representing the desirable or reference current value.

Hence, at output from the amplifier 164 there is an analog current error signal E, representing the deviation between the current intensity I existing on the solenoid 39 and the desired current value $X_1$. Said analog current error signal E is supplied to the inverting input of a further differential amplifier 117, situated in the control logic 110, which receives on its other input, from an oscillator 118 likewise comprised in the control logic 110, a high-frequency triangular waveform, for example of 30 kHz. From the difference of said signals and as a function of the level of the analog current error signal E there is, at output from the differential amplifier 117, according to a strategy of generation of PWM signals in itself known, a second pulse-width-modulation signal P2, operating around a frequency of 30 kHz and with duty cycle that varies as a function of the analog current error signal E. Said second pulse-width-modulation signal P2 is supplied to the controller 119 for performing a second modulation, which is superimposed on the first pulse-width-modulation signal P1.

In greater detail, with reference to the plot of FIG. 12A, in said time plot is represented schematically the first pulse-width-modulation signal P1, which has a total period T, whilst the high level of current I is held for a period of opening T0, corresponding to the state of opening of the solenoid valve 25. As has been said, by varying the period T0, the ratio between the opening time of the valve and the total period in each cycle of opening and closing of the valve varies, so obtaining the regulation or reduction of the pressure via a closed-loop control on the basis of a desired pressure or setpoint, received by the engine control unit C (in the case of the regulator) or set by blowing of the fuses in a nonvolatile memory in the control logic (in the case of the reducer), as well as on the basis of a signal of the pressure existing in the rail 2, which is fed back, namely, the rail pressure signal $P_{rail}$.

Figure 12B:
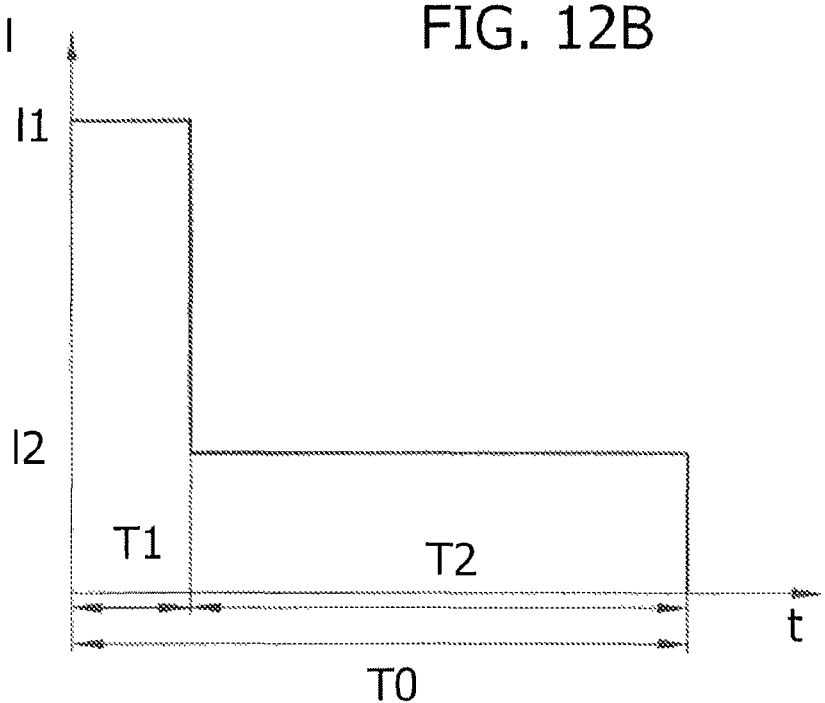

Detailed, instead, in FIG. 12B is the waveform of the pulse-width-modulation signal P1, approximated for convenience of representation as a square wave as in FIG. 12A in order to render more understandable the timing of the first pulse-width modulation applied. As may be noted from the plot of FIG. 12B, the square wave of the signal P1 is in actual fact a signal of the peak & hold type, which comprises a first level of peak current I1, which is higher, held for a peak period T1, and a second level of hold current I2, which is lower, held for a subsequent hold period T2. Of course, the sum of the periods T1 and T2 corresponds to the period T0 of opening of the valve, but the period T1 corresponds to the initial step of opening of the valve, which necessitates a higher value of current intensity for moving the mobile element, for example 12 A, whilst the period T2 corresponds to holding of the valve in the open position, which necessitates a lower current intensity, for example 5A. When the period of opening T0 varies, the peak period T1 preferably varies only up to a maximum value (e.g., 2.5 ms) and not beyond, whereas the rest of the variation of the period of opening T0 is obtained at the expense of the hold period T2.

Figure 12C:
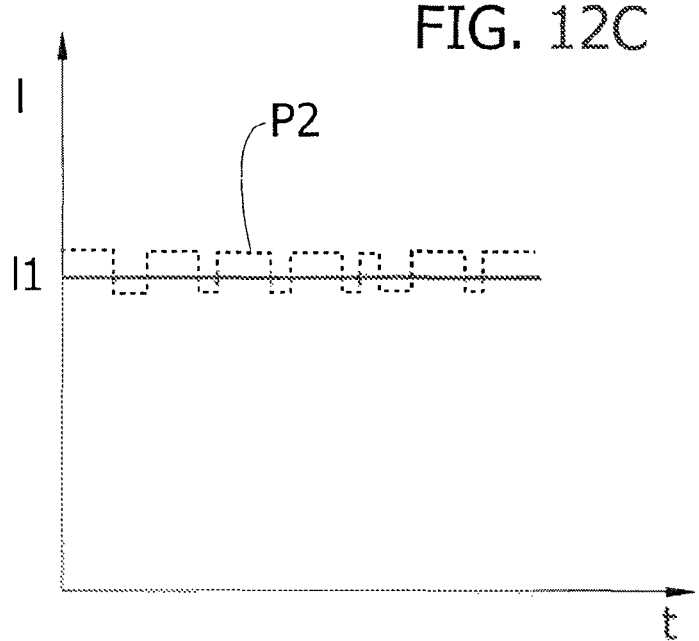

Represented then in FIG. 12C is a part of the waveform of FIG. 12B, corresponding in particular to the first level of peak current I1. From said FIG. 12C it may be appreciated how, in actual fact, said level of current, as likewise, on the other hand, the second level of hold current I2, is obtained via a modulation applied by means of the second pulse-width-modulation signal P2, controlled through the current control loop described and passing through the blocks 162, which supplies the desirable current value $X_1$, 166, 164, 118 and 117, as well as by exploiting the sense resistor 180 that supplies in feedback the current value I existing on the solenoid 39 of the valve 25.

The use of the second pulse-width-modulation signal P2 is due in particular to the presence, as actuator, of the solenoid 39 of the valve 25, which cannot be supplied via a constant level on account of the inductive behaviour. In this connection, the bridge circuit 190 sees that, when, via the second pulse-width-modulation signal P2, the maximum current, i.e., the level I1, is applied, part of the current is discharged through the diode 174, until, in the next cycle of the second pulse-width-modulation signal P2, the level of the current on the MOSFET 171 and hence on the positive terminal 113 connected to the solenoid 39 goes back to 12 A.

The MOSFET 172 on the negative terminal 112, instead, during opening of the valve, goes into an ON state, but receives a constant level, not a pulse-width modulated wave. The diode 173 within the bridge circuit 190 has the function of additional protection for preventing the voltage that accumulates on the solenoid 39 from becoming higher than the direct battery voltage $V_{BD}$, thus causing possible failures.

Figure 11:
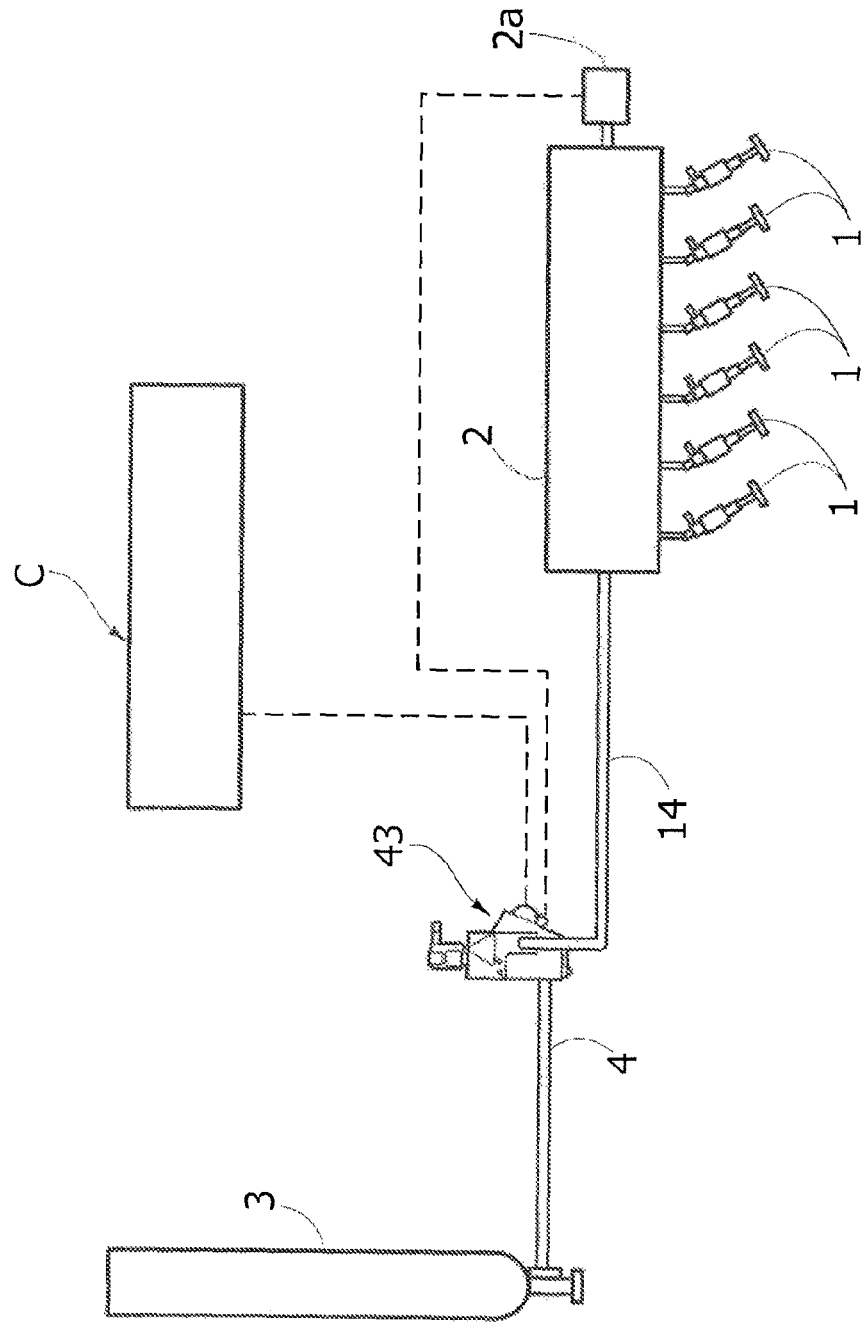
FIG. 11 is a diagram of the system according to the invention.

FIG. 11 is a schematic illustration of the gas-feed system according to the invention. In said figure, the components 5 and 6 are not illustrated, in so far as they are incorporated in the gas cylinder 3. Thanks to the use of the mechanical-electronic pressure-regulator unit 43, the components of the system comprise only the fuel tank 3, the feed line 4, which carries the gas at high pressure from the outlet of the gas cylinder 3, provided with the usual shutoff valve, to the inlet connector of the unit 43, and the duct 14 that carries the gas at low pressure at outlet from the unit 43 to the manifold or rail 2.

Hence, in a first embodiment, it may be envisaged that the single electronic control of the pressure-modulating valve is the electronic module 77 directly mounted above the body 43. In this case, the unit according to the invention can function without any connection to the electronic control unit C of the engine of the motor vehicle. The electronic module 77 for controlling the unit 43 is programmed for providing a reduction of the pressure of the gas coming from the fuel tank, according to a desired and pre-set criterion, with a high degree of precision, for example down to the order of one tenth of a bar. Thus built, the unit 43 constitutes an electronic pressure reducer.

In greater detail, with reference to the circuit diagram of FIG. 11, the closed-loop control, in the case of the electronic reducer, is obtained by receiving in feedback the pressure $P_{rail}$ existing in the rail 2 on the terminal 101 and by reading the desirable pressure value from a nonvolatile memory associated to the controller 119. Storage of the desirable pressure in said nonvolatile memory is preferably obtained via a fuse memory, which identifies initially a plurality of values of desirable pressure, for example eight values, and hence by blowing, before final use of the reducer, the appropriate fuses in the nonvolatile memory so as to fix a single value of desirable pressure for the closed-loop control on the pressure value. It is clear that in such a case the local network interface module 120 may not be present, at least for the purposes of controlling the pressure. Of course, it will be possible to use alternatively, different types of nonvolatile memory, such as EEPROMs or flash memories, other than fuse memories, for storage of the desired pressure value, even though the fuse memory constitutes a particularly low-cost solution, suited to the small size of the information to be stored.

In a second embodiment, corresponding to the circuit embodiment illustrated in FIG. 11, the electronic module 77 of the unit 43 is connected and in communication with the electronic control unit C of the engine, in particular through the terminals 100 and 116, and interacts therewith, so as to know in each instant the condition of operation of the engine and regulate accordingly the pressure reduction according to a programmed logic, as a function of the conditions of operation of the engine.

In operation, the pressure-reducing valve 7 operates in a way altogether similar to what has been described with reference to the known art. With reference to FIG. 7, in each operating condition the gas coming from the fuel tank enters the body of the unit through the inlet hole 61, passes through the filter 60 and through the shutoff valve 62, which in normal engine operation is open, and reaches the passage 56. The gas at high pressure arrives on the other hand, once again through the passage 56 and the passage 64 that branches off therefrom, at the pressure-modulating valve 25, which sees to causing it to flow through the restricted passage 32 so as to send gas at a reduced pressure to the chamber 21 of the valve 7. The piston member 18 is thus pushed upwards (as viewed in FIG. 7) in such a way as to push, via the prod 20, the ball-type open/close element 16 into an opening position, against the action of the spring 17 so that the gas at high pressure coming from the passage 56 can flow through the restricted passage 9 of the valve 7, with a reduction in pressure to the desired extent, and thus supply the distribution manifold or rail 2 at said reduced pressure, via the chamber 19, the passage 54, and the outlet 55 of the unit 43. As already described above with reference to the known art, the degree of pressure reduction of the gas from the pressure at which it is present in the gas cylinder 3 to the pressure at which it is sent to the distribution manifold or rail 2 depends upon the signal of the pressure that reaches the chamber 21 and that is determined by the pressure-modulating valve 25.

As emerges clearly from the foregoing description, the invention proposes an extreme simplification and rationalization in the system for supply of gas to the engine by providing a single mechanical-electronic unit in which both the pressure-reducing valve and the pressure-modulating valve are incorporated, as well as the further possible auxiliary devices, such as shutoff valve, filter, pressure sensor, overpressure valve. All the passages for communication between said components are made in the body of the unit. Furthermore, directly associated to the same unit is an electronic control module so as to give rise to a stand-alone device that must be simply set in the connection between the gas tank and the distribution manifold or rail, if so desired, envisaging then a communication between the electronic control module of the device and the electronic control unit of the engine.

The arrangement of the electronic module directly on the body of the unit presents some additional advantages linked to the dissipation of the heat produced by said electronic module. In fact, in the first place, the gas that passes into the unit is, on account of the process of expansion that it undergoes, at a low temperature. Consequently, the electronic module does not require cumbersome or difficult solutions for the dissipation of the heat generated by the circuits, in particular by the MOSFETs, in so far as the heat is absorbed by the gas. Said heat absorbed by the gas constitutes a further advantage in so far as usually in said systems the gas must be in any case heated for use in combustion.

Of course, without prejudice to the principle of the invention, the details of construction and the embodiments may vary widely with respect to what is described and illustrated purely by way of example herein, without thereby departing from the scope of the present invention.

Figure 13:
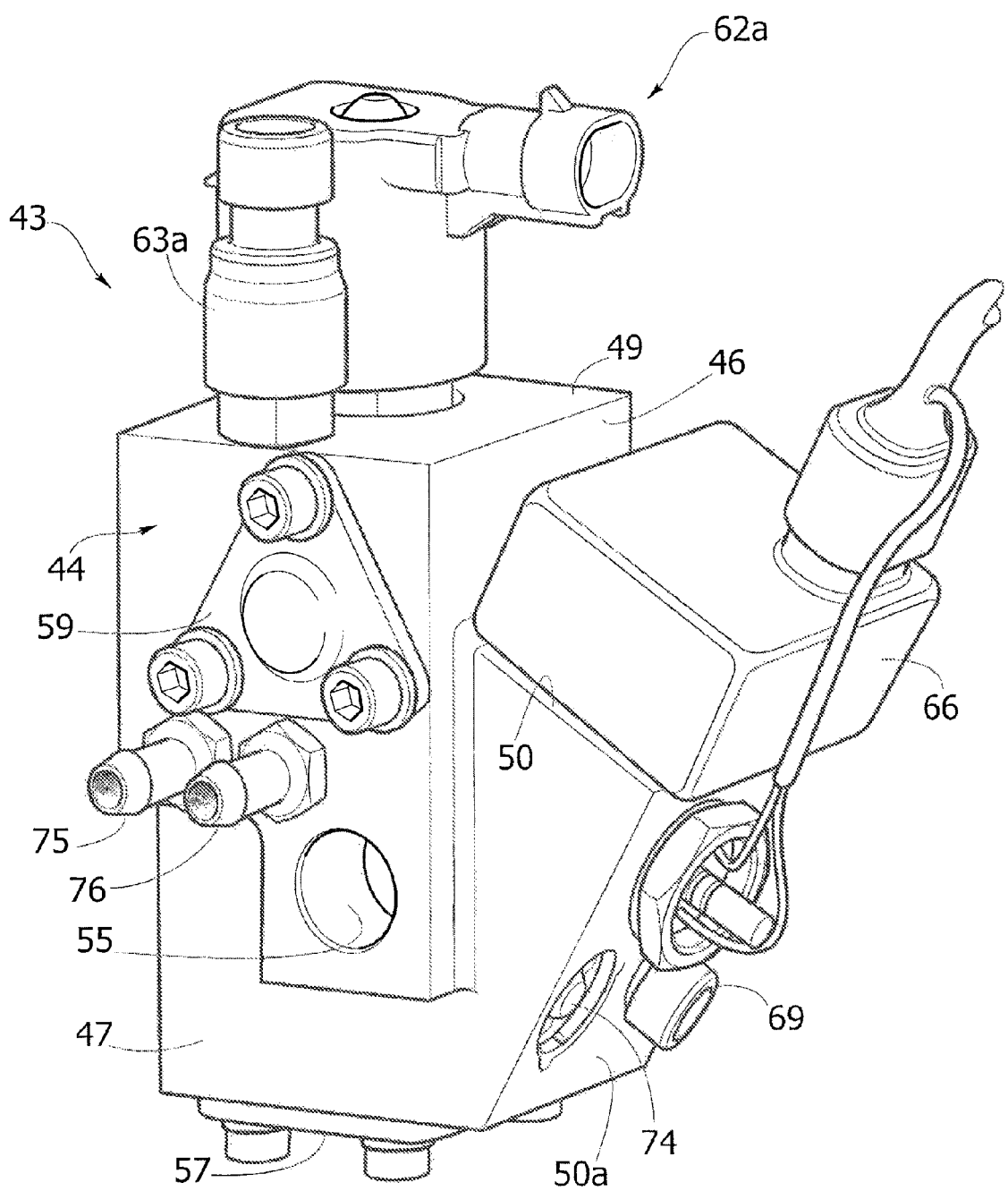
FIG. 13 is a variant of FIG. 4.

FIG. 13 illustrates an alternative example of embodiment, with a different positioning of the electronic module 77 and of the corresponding casing 66. Said figure also illustrates the cables for connection between the module 66 and the solenoid of the modulating solenoid valve 25.

What is claimed is:
1. A gas-feed system, for feeding methane or hydrogen to an internal-combustion engine, the system comprising:
   a plurality of electromagnetically controlled injectors coupled to the various cylinders of the engine;
   a distribution manifold or rail communicating with said injectors;
   a tank for supplying gas to the distribution manifold where pressurized gas is accumulated; and
   a pressure-reducing valve set in a connection between the tank and said distribution manifold, wherein said pressure-reducing valve comprises:
      an inlet connected to the tank and an outlet connected to the distribution manifold, as well as an auxiliary inlet; and
      valve means configured to determine a reduction in pressure of the gas in the passage from said inlet to said outlet, said pressure reduction being dependent upon a pressure signal sent to said auxiliary inlet, a modulating solenoid valve for sending said pressure signal to said auxiliary inlet, said modulating solenoid valve comprising:
an inlet communicating with the fuel tank;
an outlet communicating with the auxiliary inlet of the pressure-reducing valve, as well as with the distribution manifold;
a solenoid for control of a mobile anchor that controls communication between the inlet and the outlet of the modulating solenoid valve so as to bring about a predetermined reduction in pressure of the gas in the passage from the inlet to the outlet of the modulating solenoid valve,
electronic means for control of the solenoid of said modulating solenoid valve; and
wherein the pressure-reducing valve and the modulating solenoid valve are integrated in a body of a single electronic pressure-reducer or pressure-regulator unit,
said body comprising:
the inlet for the gas coming from the fuel tank;
the outlet for the gas that is supplied to the distribution manifold or rail;
a passage for communication between the inlet and the pressure-reducing valve;
a passage for communication between the inlet and the modulating solenoid valve;
a passage for communication between the modulating solenoid valve and the pressure-reducing valve;
a passage for communication between the modulating solenoid valve and the outlet; and
a passage for communication between the pressure-reducing valve and the outlet,
said unit further incorporating an electronic control module for controlling the solenoid of the modulating solenoid valve, said electronic control module comprising electronic means for comparing a signal indicating the effective pressure existing in the distribution manifold or rail with a pressure reference signal and for controlling, on the basis of said comparison according to a closed-loop logic, the solenoid of the modulating solenoid valve;
said body of said unit further comprising a passage for direct fluid communication of the outlet of the modulating solenoid valve with the distribution manifold or rail, said passage for communication comprising a restricted section defined by a hole of predetermined dimensions.

2. The system according to claim 1, wherein said unit incorporates a shutoff valve for interrupting passage of the gas to the inlet of the unit.

3. The system according to claim 1, wherein the unit incorporates a filter that is traversed by the gas entering the unit.

4. The system according to claim 1, wherein said unit incorporates a sensor for measuring the pressure of the gas entering the unit.

5. The system according to claim 1, wherein said passage with restricted section is formed in the body of an element fixed in an uncoupleable way to the body of the unit.

6. The system according to claim 5, wherein said element including the passage with restricted section is a screw screwed in a hole made in the body of said unit starting from an outer surface thereof.

7. The system according to claim 1, wherein said electronic means comprise means for making the aforesaid check of the solenoid by means of generation of a first pulse-width-modulation signal so as to enable variation of pressure reduction caused by the modulating solenoid valve by means of a variation of the ratio between the opening time and the total period in each cycle of opening and closing of the solenoid valve.

8. The system according to claim 7, wherein said first pulse-width-modulation signal includes, for each cycle of opening of the modulating solenoid valve a pulse having a first part with higher intensity, to cause opening of the valve, and a second part with lower intensity, to keep said modulating solenoid valve open.

9. The system according to claim 8, wherein said electronic means are configured to compare a signal indicating the effective current existing on the solenoid of the modulating solenoid valve with a current reference signal and for controlling, on the basis of said comparison according to a closed-loop logic, at least one of the current intensity of said first part with higher intensity and of said second part with lower intensity, for controlling the opening current intensity in the solenoid.

10. The system according to claim 9, wherein said electronic means comprise means for making the aforesaid check of the opening current intensity in the solenoid via the generation of a second pulse-width-modulation signal superimposed on the first pulse-width-modulation signal that varies the pressure reduction caused by the modulating solenoid valve by means of a variation of the duty cycle of the solenoid valve.

11. The system according to claim 1, wherein said pressure reference signal is a predetermined value stored in said electronic control module.

12. The system according to claim 1, wherein said pressure reference signal is issued by an electronic control unit with which the aforesaid electronic control module is in communication, for carrying out a regulation of the modulating valve according to the operating conditions.

13. The system according to claim 1, further comprising a bridge circuit associated between said electronic control module and said solenoid, said bridge configured to supply current to said solenoid and to discharge a part of said current.

14. A gas-feed system, for feeding methane or hydrogen to an internal-combustion engine, the system comprising:
a plurality of electromagnetically controlled injectors coupled to the various cylinders of the engine;
a distribution manifold or rail communicating with said injectors;
a tank for supplying gas to the distribution manifold where pressurized gas is accumulated; and
a pressure-reducing valve set in a connection between the tank and said distribution manifold, wherein said pressure-reducing valve comprises:
an inlet connected to the tank and an outlet connected to the distribution manifold, as well as an auxiliary inlet; and
valve means configured to determine a reduction in pressure of the gas in the passage from said inlet to said outlet, said pressure reduction being dependent upon a pressure signal sent to said auxiliary inlet,
a modulating solenoid valve for sending said pressure signal to said auxiliary inlet, said modulating solenoid valve comprising:
an inlet communicating with the fuel tank;
an outlet communicating with the auxiliary inlet of the pressure-reducing valve, as well as with the distribution manifold;
a solenoid for control of a mobile anchor that controls communication between the inlet and the outlet of the modulating solenoid valve so as to bring about a predetermined reduction in pressure of the gas in the passage from the inlet to the outlet of the modulating solenoid valve, electronic means for control of the solenoid of said modulating solenoid valve; and wherein the pressure-reducing valve and the modulating solenoid valve are integrated in a body of a single electronic pressure-reducer or pressure-regulator unit, said body comprising:

the inlet for the gas coming from the fuel tank;

the outlet for the gas that is supplied to the distribution manifold or rail;

a passage for communication between the inlet and the pressure-reducing valve;

a passage for communication between the inlet and the modulating solenoid valve;

a passage for communication between the modulating solenoid valve and the pressure-reducing valve;

a passage for communication between the modulating solenoid valve and the outlet; and a passage for communication between the pressure-reducing valve and the outlet, said unit further incorporating an electronic control module for controlling the solenoid of the modulating solenoid valve, said electronic control module comprising electronic means for comparing a signal indicating the effective pressure existing in the distribution manifold or rail with a pressure reference signal and for controlling, on the basis of said comparison according to a closed-loop logic, the solenoid of the modulating solenoid valve;

said body of said unit further comprising a passage for direct communication of the outlet of the modulating solenoid valve with the distribution manifold or rail, said passage for communication comprising a restricted section formed in an element removably attached to the body of the unit.

15. The system of claim 14, wherein said element comprises a screw received in a cavity of the body of said unit, said passage being in an interior of said screw.

16. The system of claim 15 further comprising a second screw configured to be received in said cavity wherein said screw comprises a second passage having a dimension different than a dimension of said passage for communication comprising a restricted section.

* * * * *

UNITED STATES PATENT AND TRADEMARK OFFICE
CERTIFICATE OF CORRECTION

PATENT NO. : 8,132,561 B2
APPLICATION NO. : 11/930833
DATED : March 13, 2012
INVENTOR(S) : Audisio et al.

It is certified that error appears in the above-identified patent and that said Letters Patent is hereby corrected as shown below:

In the Abstract (57) please amend as follows:

~~Provided in a gas feed system, in particular a~~ A system for supplying methane or hydrogen to an internal-combustion engine, ~~is~~ includes an electronic pressure-reducer or pressure-regulator unit having~~, integrated in which are both~~ a pressure-reducing valve for reducing the pressure of ~~the~~ gas coming from ~~the~~ a fuel tank to a value suitable for supplying a distribution manifold or rail and a modulating solenoid valve that functions as modulator of the degree of pressure reduction performed by the pressure-reducing valve. ~~Likewise made in the~~ The body of ~~said~~ the unit ~~are~~ includes passages formed therein that provide ~~the communications~~ communication of ~~said~~ the valves with one another and of each of ~~said~~ the valves with the inlet and the outlet for the gas in ~~said~~ the unit. Furthermore, the unit incorporates an electronic control module for controlling the modulating solenoid valve.

Signed and Sealed this
First Day of May, 2012

David J. Kappos
*Director of the United States Patent and Trademark Office*